H. C. HEATH.
LUBRICATOR.
APPLICATION FILED JUNE 16, 1919.
1,324,396. Patented Dec. 9, 1919.
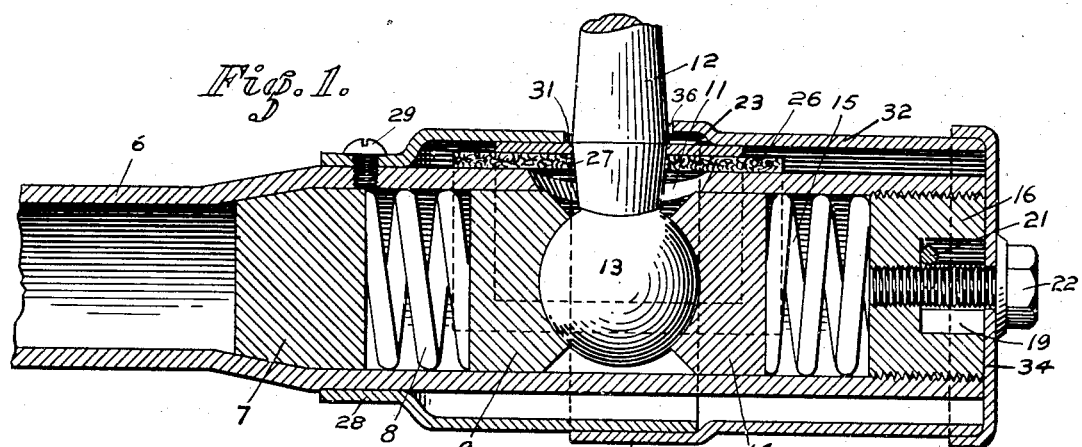
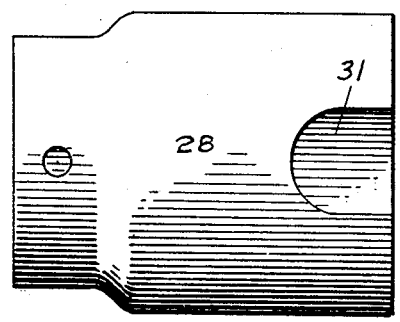
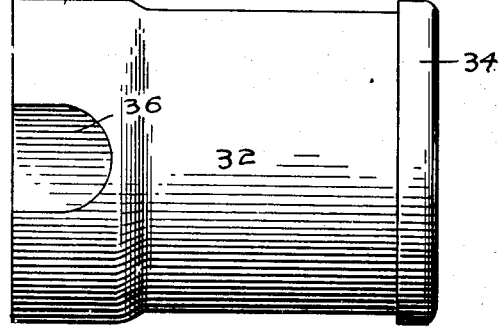
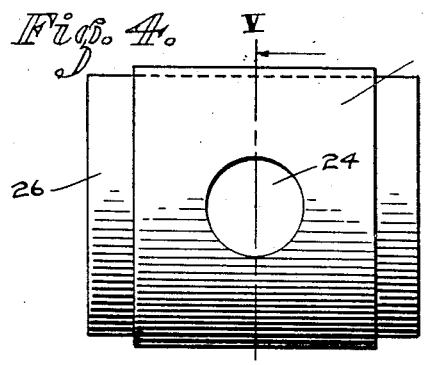
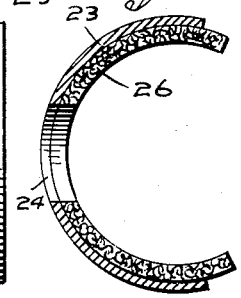
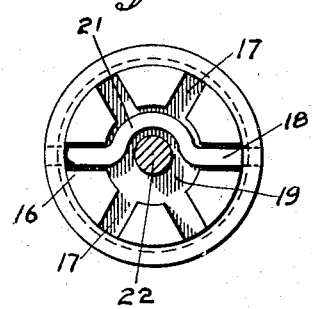
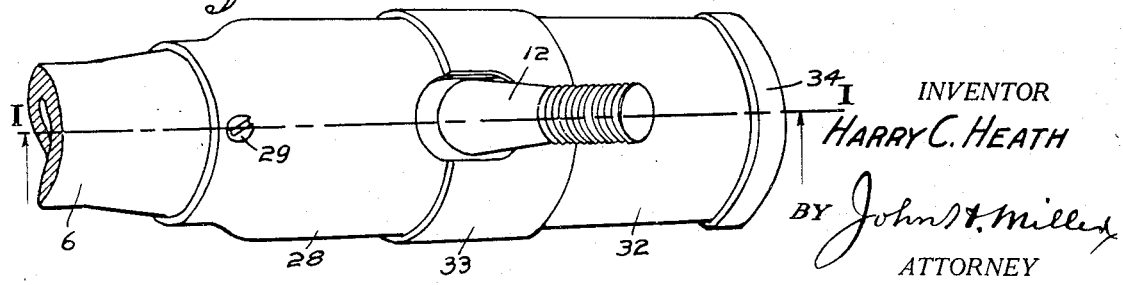
INVENTOR
HARRY C. HEATH
BY John H. Miller
ATTORNEY

UNITED STATES PATENT OFFICE.

HARRY C. HEATH, OF SAN FRANCISCO, CALIFORNIA.

LUBRICATOR.

1,324,396.  Specification of Letters Patent.  Patented Dec. 9, 1919.

Application filed June 16, 1919. Serial No. 304,428.

*To all whom it may concern:*

Be it known that I, HARRY C. HEATH, a citizen of the United States, and a resident of the city and county of San Francisco, State of California, have made a new and useful invention—to wit, an Improvement in Lubricators; and I hereby declare the following to be a written description of the same in such full, clear, concise, and exact terms as to enable any person skilled in the art to which it appertains or to which it is most nearly connected to make, construct, and use the same.

This invention relates to a new and useful improvement in lubricators. The principal object of this invention is to provide a lubricator adapted to contain a quantity of lubricant, and to also exclude any dust or dirt from the parts being lubricated, as dust and dirt would cause excessive wear of the ball joint to which same is adapted to be applied. Other objects and advantages will appear as the description progresses.

In this specification and the annexed drawings, the invention is illustrated in the form considered to be the best, but it is to be understood that the invention is not limited to such form because it may be embodied in other forms and it is also to be understood that in and by the claims following the description it is desired to cover the invention in whatever form it may be embodied.

Referring to the drawings which accompany and are a part of this specification,

Figure 1 is a longitudinal cross section on the line I—I of Fig. 6.

Figs. 2 and 3 are plan views in elevation of the protector.

Fig. 4 is a plan view in elevation of a shield with a felt member attached thereto.

Fig. 5 is a cross section taken on the line V—V of Fig. 4.

Fig. 6 is a perspective view of my assembled device.

Fig. 7 is a detail view of a locking pin.

For the purpose of illustration I herein show the invention as applied to the steering arm of an automobile, but it may be applied and used in other connections.

The numeral 6 refers to the steering arm of an automobile which is tubular and expanded near its forward end. At 7 I have shown a plug seated within the expanded portion of the steering arm 6. At 8 I have shown a coiled spring adapted to abut the plug 7 and press against a socket member 9, which member is slidable within the steering arm 6.

At 11 I provide an orifice through which a ball joint of the steering knuckle 12 extends. This steering knuckle terminates in a ball 13 adapted to be firmly held against the socket member 9 by a similar socket member 14 held by a spring 15 which spring in turn is held by a screw plug 16. This screw plug is provided with radial slots 17, which are adapted to accommodate a long pin 18. A central bore is provided at 19 receiving the curved portion 21 of the long pin 18. This curved portion 21 is adapted to extend around a screw threaded member 22, the purpose of which will be hereinafter described. The ends of the pin 18 are adapted to pass through suitable openings in the end of the steering arm, and thus prevent rotation of the member 16.

At 23 I have shown a shield having an opening 24 therein. This shield is semi-circular in cross section and carries a felt member 26 suitably attached thereto.

In operation this shield 23 is held over the steering knuckle so that the said steering knuckle passes through the opening 24 and the edges of the shield surround said steering knuckle. Intimate contact with the felt member 26 will also be provided at the point 27 which will exclude any dirt and dust from entering the steering knuckle 12 and the shield 23. The felt 26 will also be in intimate contact with the outer surface of the steering arm 6 at all points adjacent the orifice 11. At 28 I have shown a protector having a reduced portion of the same inner diameter as the steering arm 6 and connected thereto by a screw 29. This protector 28 is provided with a substantially semi-circular cut away portion 31 adapted to surround the steering knuckle 12, and allow the same to move freely therethrough. The enlarged portion of this protector 28 will surround the shield 23 and felt member 26.

At 32 I have shown a protector having an expanded portion 33 and a cap portion 34. The same is slipped over the end of the steering arm 6 so that the enlarged portion 33 will overlie the end of the protector 28, and the cap portion 34 will abut the end of said steering arm.

At 36 I have provided a cut away portion similar to the cut away portion 31, which cut away portion is adapted to pass around the steering arm 12 in a similar manner to that of the cut away portion 31.

The numeral 22 previously referred to designates a screw member passing through the cap portion 34 at its center and engaging the member 16. This screw 22 serves to hold the protector 32 upon the end of the steering arm. The bend 21 of the pin 18 allows this screw 22 to pass and engage the member 16.

It will thus be seen that I have provided a protector and lubricator which will allow the steering knuckle to move freely with relation to the steering arm, and at the same time will retain all lubrication within the protector and prevent the admission of any dust, dirt or injurious foreign elements.

Reference is herein made to my co-pending applications Serial No. 286,224, filed March 31, 1919, and Serial No. 331,025 filed Oct. 16, 1919.

Having thus described my invention what I claim as new and desire to secure by Letters Patent of the United States is:

1. In a device of the character described, the combination of a steering arm, a steering knuckle adapted to be attached to said steering arm through the medium of a ball connection, a protector carried by said steering arm and having a cut away portion surrounding the end of said steering knuckle, a second protector member inclosing the end of said steering arm and having a telescoping connection with said first mentioned connector, a cut away portion in said second mentioned protector adapted to surround the end of said steering knuckle, and means for preventing escapement of lubricant from within said protectors.

2. In a device of the character described, the combination of a steering mechanism comprising a steering arm, a steering knuckle having a ball connection therewith, a semi-circular shield having an opening therein adapted to surround the end of said steering knuckle, a felt member carried by said semi-circular member and adapted to have intimate contact with said steering knuckle and said steering arm, and telescoping members adapted to surround and inclose said shield.

3. In a device of the character described, the combination of a steering arm, a steering knuckle having ball engagement therewith, telescoping members surrounding said steering arm and inclosing said ball connection, and a shield mounted within said telescoping members and capable of longitudinal and lateral movement.

4. A steering knuckle for vehicles consisting of an arm inclosing a two-part socket and spring means therefor, a ball ended lever, the ball end adapted to be engaged within the socket, a sleeve segment spaced from the periphery of the arm and provided with a hole through which the lever passes, a washer of felt or the like between the segment and the arm and snugly embracing the lever and a member within which the segment slides and fixed to the arm and provided with an enlarged hole through which the lever is laterally free.

In testimony whereof, I have hereunto set my hand at San Francisco, California, this 21st day of May 1919.

HARRY C. HEATH.

In presence of—
A. W. BOYKEN,
P. S. PIDWELL.